United States Patent
Yano et al.

(10) Patent No.: US 8,233,230 B2
(45) Date of Patent: Jul. 31, 2012

(54) METHOD AND APPARATUS FOR CONTROLLING HEAD WITH SPIN-TORQUE OSCILLATOR IN A DISK DRIVE

(75) Inventors: Koji Yano, Ome (JP); Kazuhito Shimomura, Fussa (JP); Akihiko Takeo, Tachikawa (JP); Masayuki Takagishi, Kunitachi (JP); Kenichiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 166 days.

(21) Appl. No.: 12/693,201

(22) Filed: Jan. 25, 2010

(65) Prior Publication Data

US 2010/0232053 A1 Sep. 16, 2010

(30) Foreign Application Priority Data

Mar. 13, 2009 (JP) .................................. 2009-060936

(51) Int. Cl.
*G11B 21/02* (2006.01)
(52) U.S. Cl. ......................................................... 360/75
(58) Field of Classification Search .................. 360/75, 360/61, 46, 55, 68, 27, 110
See application file for complete search history.

(56) References Cited

U.S. PATENT DOCUMENTS

| 4,286,294 A * | 8/1981 | Nakauchi et al. ............... 360/27 |
| 6,011,664 A | 1/2000 | Kryder et al. |
| 7,791,829 B2 * | 9/2010 | Takeo et al. .................... 360/55 |
| 2005/0023938 A1 | 2/2005 | Sato et al. |
| 2005/0219771 A1 | 10/2005 | Sato et al. |
| 2009/0059418 A1 * | 3/2009 | Takeo et al. .................... 360/75 |
| 2009/0080106 A1 * | 3/2009 | Shimizu et al. ................. 360/75 |
| 2009/0080120 A1 * | 3/2009 | Funayama et al. ............ 360/319 |
| 2009/0316304 A1 * | 12/2009 | Funayama et al. ........ 360/234.3 |
| 2010/0007996 A1 * | 1/2010 | Iwasaki et al. ................ 360/324 |
| 2010/0027158 A1 * | 2/2010 | Takagishi et al. ........ 360/77.02 |
| 2010/0134922 A1 * | 6/2010 | Yamada et al. .......... 360/123.01 |

FOREIGN PATENT DOCUMENTS

| JP | 2007-221764 | 8/2007 |
| JP | 2007-310949 | 11/2007 |
| JP | 2008-123669 | 5/2008 |
| JP | 2008-305486 | 12/2008 |

OTHER PUBLICATIONS

Notice of Reasons for Rejection for Japanese patent application No. 2009-060936, mailed on Apr. 13, 2010 by Japanese Patent Office.

* cited by examiner

*Primary Examiner* — Fred Tzeng
(74) *Attorney, Agent, or Firm* — Knobbe Martens Olson & Bear LLP

(57) ABSTRACT

According to one embodiment, a disk drive has a magnetic disk and a magnetic head having a spin-torque oscillator. The disk drive further has a head amplifier IC configured to supply a write signal and a drive signal to the magnetic head. The write signal corresponds to write data. The drive signal is supplied to generate a high-frequency magnetic field. The head amplifier IC continuously supplies a drive signal of normal level to the spin-torque oscillator, and supplies a drive signal of high level higher than the normal level, only for a prescribed time after the polarity inversion of the write signal.

13 Claims, 6 Drawing Sheets

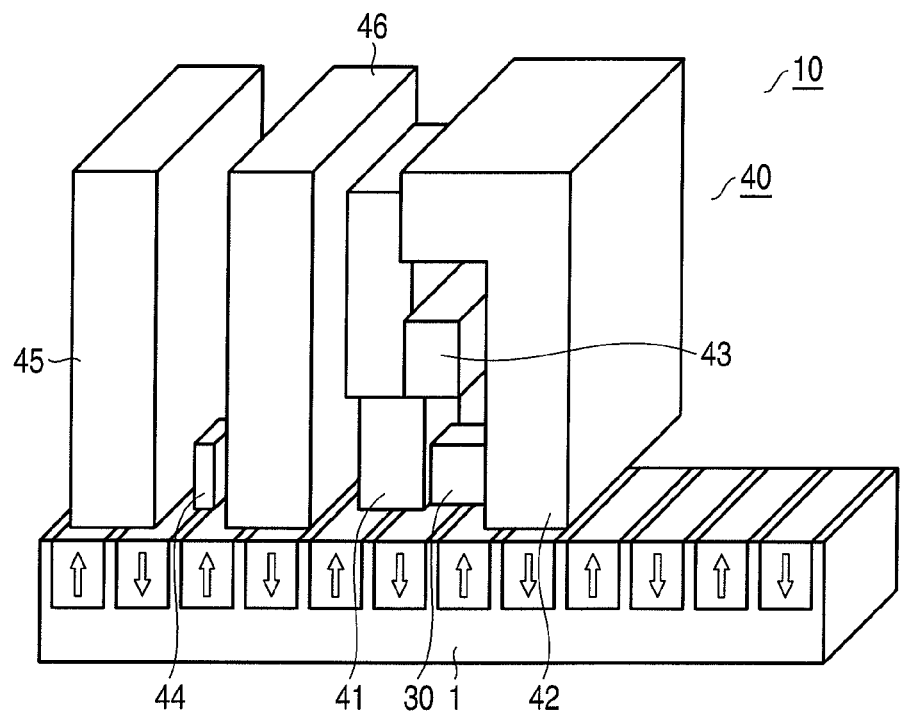
F I G. 4
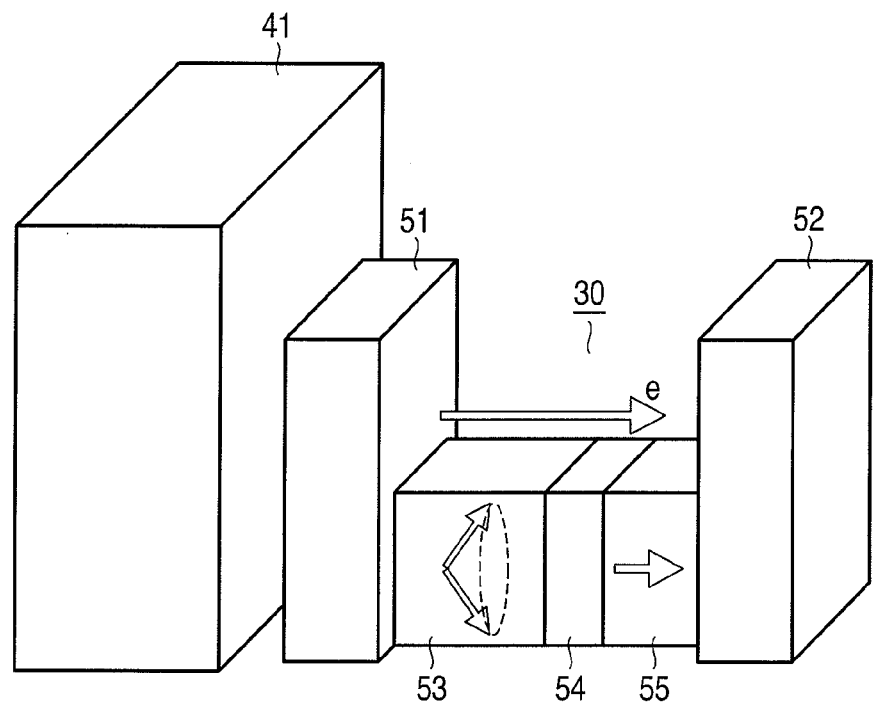
F I G. 5

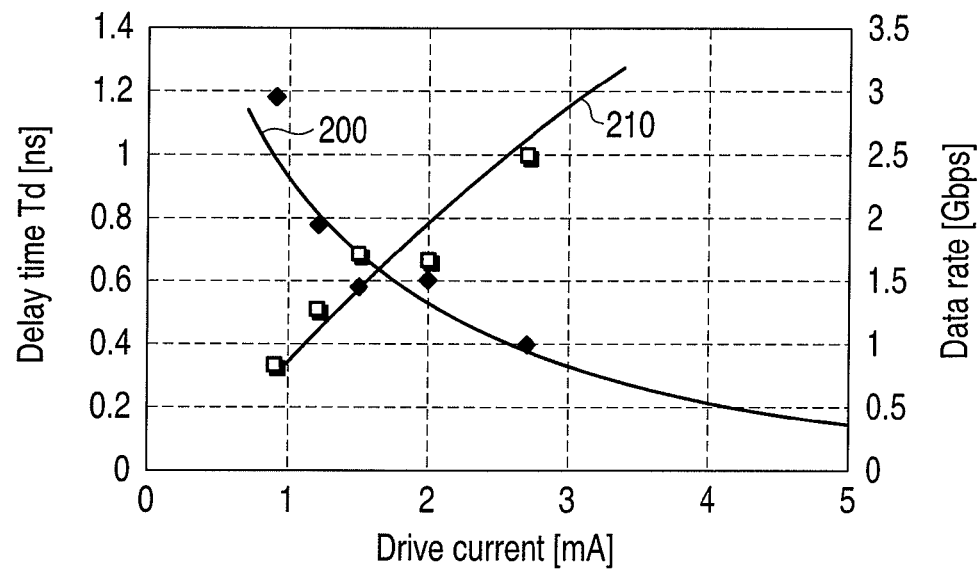
F I G. 7
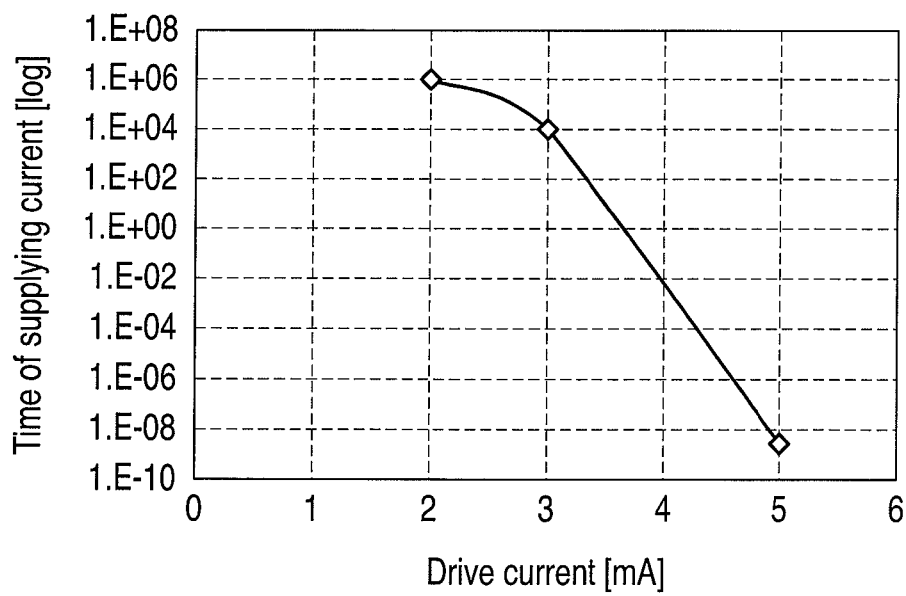
F I G. 8

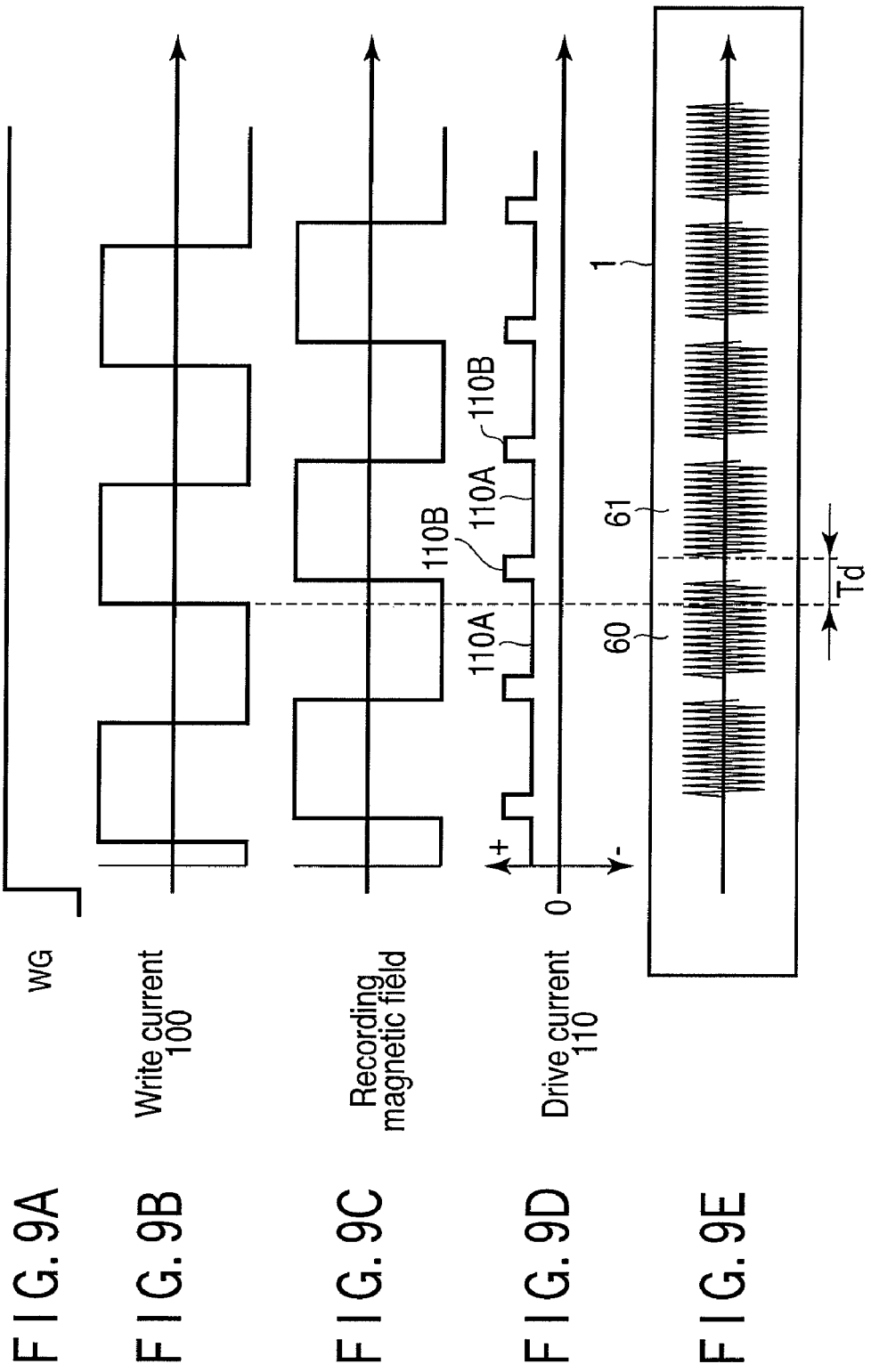

METHOD AND APPARATUS FOR CONTROLLING HEAD WITH SPIN-TORQUE OSCILLATOR IN A DISK DRIVE

CROSS-REFERENCE TO RELATED APPLICATIONS

This application is based upon and claims the benefit of priority from Japanese Patent Application No. 2009-060936, filed Mar. 13, 2009, the entire contents of which are incorporated herein by reference.

BACKGROUND

1. Field

One embodiment of the present invention relates to a disk drive, and more particularly to a technique of controlling the magnetic head that includes a spin-torque oscillator configured to accomplish microwave assisted recording.

2. Description of the Related Art

In recent years, the recording density and capacity have been increased in the field of disk drives, the representative example of which is the hard disk drive, owing to the development of giant magnetoresistive (GMR) magnetic heads and perpendicular magnetic recording. Along with the GMR magnetic head and the perpendicular magnetic recording, the high-frequency assisted recoding performed by applying a high-frequency magnetic field to a magnetic disk has been proposed as a technique that may further increase the recording density. (See, for example, U.S. Pat. No. 6,011,664.)

In the high-frequency assisted recording, a high-frequency magnetic field is applied to a selected part of a magnetic disk, at a frequency that is much higher than the frequency of signals to be recorded and is near the resonance frequency of the disk. When applied with the high-frequency magnetic field, the magnetic disk undergoes resonance. As a result, the coercive force (Hc) at that part of the disk surface, which is applied with the high-frequency magnetic field, decreases to half or less the initial coercive force. In this state, a high-frequency magnetic field is superimposed on the recording magnetic field, whereby data can be recorded on the disk having a high coercive force (Hc) and a high magnetic anisotropic energy (Ku). In the method disclosed in the above-identified patent, however, a coil generates the high-frequency magnetic field, which cannot be efficiently applied to the disk at the time of high-density recording.

As a technique of solving this problem, a method is proposed, in which a spin-torque oscillator (hereinafter referred to as STO, in some cases) is used as a source of a high-frequency magnetic field. (See, for example, US-A 2005/0023938 and US-A 2005/0219771.) In this method, a direct current is supplied to the STO through an electrode, making the STO generate a high-frequency magnetic field.

A spin-torque oscillator may be incorporated into a magnetic head. High-density magnetic recording can then be effectively performed only on that part of a magnetic disk, where the high-frequency magnetic field the spin-torque oscillator generates is superimposed on the recording magnetic field the magnetic head generates.

In any disk drive, a write current (recording current) is supplied to the magnetic head. The write current is inverted in polarity in accordance with the data to write on the magnetic disk. The spin-torque oscillator has a delay time (oscillation delay), i.e., time that elapses until it starts oscillation after the write current has been inverted in polarity. Consequently, the data transfer rate of the disk drive increases. If magnetization inversion is repeated at intervals shorter than the oscillation delay to write data on the magnetic disk, the spin-torque oscillator will fail to operate appropriately, possibly causing recording errors.

SUMMARY OF THE INVENTION

Certain embodiments contemplate a disk drive comprising: a magnetic disk; a magnetic head comprising a main magnetic pole configured to generate a recording magnetic field and a spin-torque oscillator, the spin-torque oscillator being near the main magnetic pole and configured to apply a high-frequency magnetic field to the magnetic disk in order to record data on the magnetic disk. The disk drive further comprises a write-signal transmitter configured to transmit a write signal corresponding to write data to the magnetic head, in order to record the data on the magnetic disk and a controller configured to continuously supply a drive signal of a first predetermined level to the spin-torque oscillator in order to record the data and to supply a drive signal of a second level higher than the first predetermined level, for a predetermined time after the write signal has been inverted in polarity.

In some embodiments, the controller comprises a module configured to superimpose the drive signal of the second level on the drive signal of the first predetermined level for the predetermined time after the polarity inversion of the write signal. In some embodiments, the controller comprises an inversion-detecting module configured to detect polarity inversion of the write signal from the write-signal transmitter, and a signal-generator configured to generate a drive signal at a level higher than the first predetermined level for the predetermined time. In some embodiments, the write-signal transmitter is configured to transmit a write signal corresponding to the write data to the magnetic head after a write gate signal is received instructing a start of data recording, and the controller is configured to supply the drive signal of the first predetermined level to the spin-torque oscillator when or after the write gate signal is received.

In some embodiments, the controller comprises an inversion-detecting module configured to detect polarity inversion of the write signal from the write-signal transmitter, and a delay module configured to generate a designated delay time from the detected polarity inversion, wherein the controller is configured to first supply a drive signal of a level higher than the first predetermined level for a predetermined time after the designated delay time from the detected polarity inversion, and then to supply a drive signal of the first predetermined level. In some embodiments, the controller is configured to supply a current signal or a voltage signal, as the drive signal, to the spin-torque oscillator. In some embodiments, the controller comprises a register configured to hold at least one of values comprising the value of the drive signal of the first predetermined level, the value of the drive signal of the second level, the duration of the signal of the second level and the designated delay time.

Certain embodiments contemplate a head control apparatus comprising: a write-signal transmitter configured to transmit a write signal corresponding to write data to a magnetic head comprising a spin-torque oscillator configured to apply a high-frequency magnetic field to a magnetic disk in order to record data on the magnetic disc; and a controller configured to continuously supply a drive signal of a first predetermined level to the spin-torque oscillator in order to record data on the magnetic disk, and to supply a drive signal of a second level higher than the first predetermined level to the spin-torque oscillator for a predetermined time after the write signal corresponding to the write data is inverted in polarity.

In some embodiments, the controller comprises a module configured to superimpose the drive signal of the second level on the drive signal of the first predetermined level supplied to the spin-torque oscillator, for a predetermined time after the write signal is inverted in polarity in order to supply the drive signal of the second level to the spin-torque oscillator.

In some embodiments, the controller comprises: an inversion-detecting module configured to detect polarity inversion of the write signal from the write-signal transmitter; a delay module configured to generate a designated delay time from the detected polarity inversion; a pulse generating module configured to generate a pulse signal comprising a pulse width, for a predetermined time after the designated delay time has elapsed; and a module configured to supply a drive signal of a level higher than the first predetermined level to the spin-torque oscillator, in accordance with the pulse signal.

In some embodiments, the controller is configured to supply a current signal or a voltage signal, as the drive signal, to the spin-torque oscillator. In some embodiments, the apparatus further comprises a register configured to hold at least one of values comprising the value of the drive signal of the predetermined level, the value of the drive signal of the second level, the duration of the signal of the second level and the designated delay time.

Certain embodiments contemplate a method of controlling a magnetic head incorporated in a disk drive and comprising a spin-torque oscillator configured to apply a magnetic disk in order to record data on the magnetic disk, the method comprising: continuously supplying a drive signal of a first predetermined level to the spin-torque oscillator in order to record the data; supplying a write signal corresponding to write data to the magnetic head, in order to record the data; detecting polarity inversion of the write signal; and supplying a drive signal of a second level higher than the first predetermined level for a predetermined time when the polarity inversion of the write signal is detected.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 4 is a diagram showing the structure of a magnetic head incorporated in the embodiment;

FIG. 5 is a diagram showing the structure of a spin-torque oscillator used in the embodiment;

FIG. 7 is a graph showing the relationship between the drive current and oscillation delay time of the spin-torque oscillator used in the embodiment;

FIG. 8 is a diagram showing the relationship between the drive current of the spin-torque oscillator and the time for which a current is supplied to the oscillator until the oscillator fails; and FIGS. 9A to 9E are a timing chart explaining how the magnetic head and head the amplifier IC operate in the embodiment.

DETAILED DESCRIPTION

Various embodiments according to the invention will be described hereinafter with reference to the accompanying drawings. In general, according to one embodiment of the invention, there is provided a disk drive that performs high-frequency assisted magnetic recording at a high data transfer rate, by controlling the oscillation delay time of the spin-torque oscillator incorporated in a magnetic head.

The various modules of the systems described herein can be implemented as software applications, hardware and/or software modules, or components on one or more computers, such as servers. While the various modules are illustrated separately, they may share some or all of the same underlying logic or code.

(Configuration of the Disk Drive)

Figure 1:
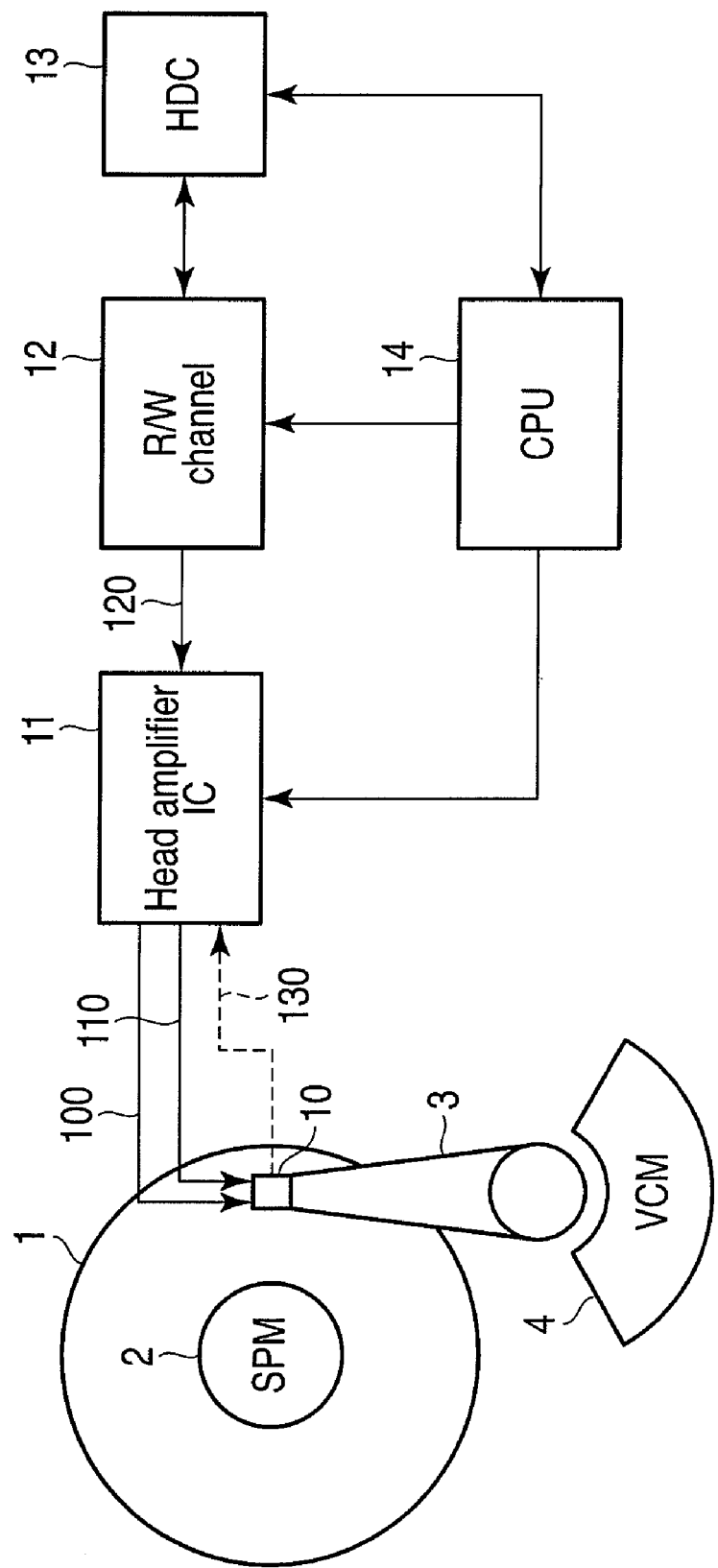
FIG. 1 is a block diagram showing the major components of a disk drive according to an embodiment of the present invention.

According to an embodiment, FIG. 1 is a block diagram showing the main configuration of a disk drive according to an embodiment of the present invention.

As shown in FIG. 1, the disk drive according to the present embodiment has a magnetic disk 1 and a magnetic head 10. The magnetic disk 1 is a perpendicular magnetic-recording medium (hereinafter referred to as disk). The magnetic head 10 has a high-frequency assist function. The disk 1 is secured to the shaft of a spindle motor (SPM) 2 and can rotate when the SPM 2 is driven. The magnetic head 10 is mounted on an actuator 3 and can be moved over the disk 10, in the radial direction thereof, as the actuator 3 is rotated by a voice coil motor 4 the actuator 3.

The disk drive 1 further has a head amplifier integrated circuit 11 (hereinafter, referred to as head amplifier IC), a read/write channel (R/W channel) 12, a disk controller (HDC) 13, and a microprocessor (CPU) 14.

The head amplifier IC 11 includes STO control device. The STO control device generates a drive signal (i.e., drive-current signal or drive voltage signal) 110. As will be described later, the drive signal 110 drives a spin-torque oscillator (STO) that accomplishes high-frequency assisted, magnetic recording. The head amplifier IC 11 supplies the magnetic head 10 to a write signal (i.e., write current) 100 that accords with a write data 120 supplied from the R/W channel 12. The head amplifier IC 11 amplifies a read signal output from the magnetic head 10 and transmits the read signal thus amplified to the R/W channel 12.

The R/W channel 12 is a signal processing circuit that encodes the write data transferred from the disk controller 13, generating write data 120. The write data 120 is output to the head amplifier IC 11. The write data 120 is data that should be recorded on the disk 1. The R/W channel 12 decodes the read data output from the disk magnetic head 10, generating read data. The read data is output to the disk controller 13.

The disk controller 13 serves as an interface between the disk drive and a host system (e.g., personal computer, not shown), and controls the transfer of the read/write data. The microprocessor (CPU) 14 is the main controller incorporated in the disk drive. It controls the read/write operation and performs the servo control to achieve the positioning of the magnetic head. The CPU 14 sets the information (parameters) necessary to operate the head amplifier IC 11, in the various registers included in the head amplifier IC 11. The registers store the value of the write current, the value of the drive current, the value of the boost signal current, the value of the boost width, and the value of the delay from the zero-cross point, respectively.

(Configuration of the Head Amplifier IC)

Figure 2:
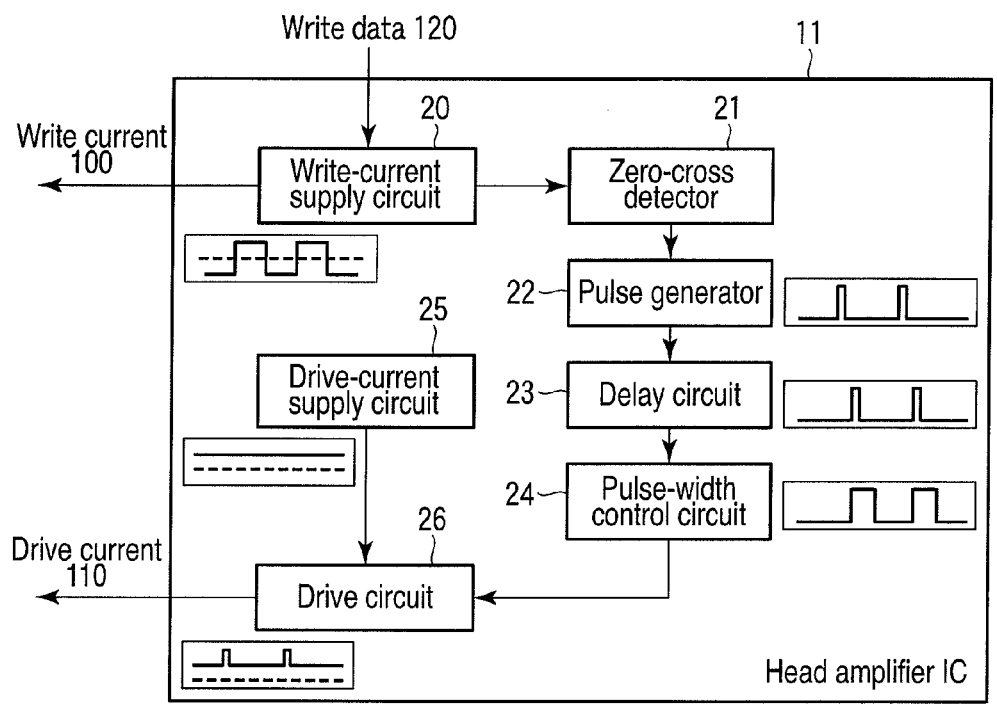
FIG. 2 is a block diagram showing the configuration of a head amplifier IC according to the embodiment.

FIG. 2 is a block diagram showing the configuration of the head amplifier IC 11 according to the embodiment.

As shown in FIG. 2, the head amplifier IC 11 has a write-current supply circuit 20 and an STO control device. The write-current supply circuit 20 is a driver for generating a write current 100 that corresponds to write data 120 supplied from the R/W channel 12. The write current 100 is supplied to the magnetic head 10. The write-current supply circuit 20 includes a register for holding the value of the write current, which has been set by the CPU 14. The write-current supply circuit 20 generates a write current 100 on the basis of the value of the write current.

The STO control device comprises a zero-cross detector 21, a pulse generator 22, a delay circuit 23, a pulse-width control circuit 24, a drive-current supply circuit 25, and a drive circuit 26. All circuits 22 to 26, but the zero-cross detector 21, include a register that holds the information (parameter) supplied from the CPU 14.

The zero-cross detector 21 detects the time the write current 100 output from the write-current supply circuit 20 is inverted in polarity. The pulse generator 22 generates a pulse signal that accords with the polarity inversion of the write current 100, which the zero-cross detector 21 has detected. The delay circuit 23 delays the pulse signal output from the pulse generator 22, by the time set in the register. The pulse-width control circuit 24 controls the pulse signal supplied from the pulse generator 22, by the pulse width that corresponds to the boost (level increase) of the drive signal 110 (described later). The pulse-width control circuit 24 is a pulse-width expanding circuit that increases the pulse width of the pulse signal supplied from the pulse generator 22.

The drive-current supply circuit 25 generates a drive current (DC component) of the normal level set in the register. The drive circuit 26 outputs, as drive current 110, either the drive current of normal level supplied from the drive-current supply circuit 25 or a boost drive current of normal level raised by a value equivalent to a boost time. The drive circuit 26 supplies, to the STO included in the magnetic head 10, the drive current 110 obtained by boosting the normal-level drive current in accordance with the boost-signal current value set in the register. At this point, the drive circuit 26 sets a boost time for the drive current 110, on the basis of the pulse width of the pulse signal output from the pulse-width control circuit 24. That is, the drive circuit 26 is a boost circuit that amplifies the drive current at normal level in accordance with the pulse signal output from the pulse-width control circuit 24.

Figure 3:
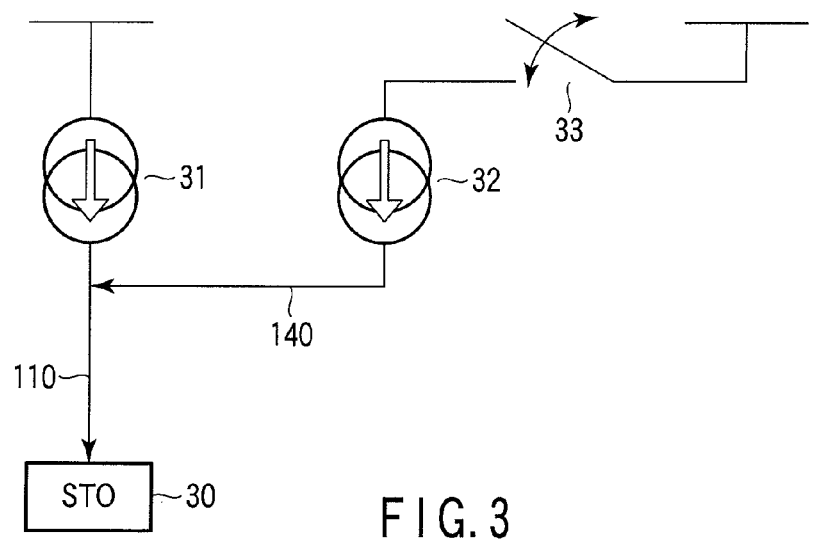
FIG. 3 is a schematic diagram showing the configuration of the STO control device provided in the embodiment.

FIG. 3 is a schematic diagram showing the configuration of the STO control device and explaining the boost control of the drive current 110.

The STO control device supplies the drive current 110 to the STO 30 included in the magnetic head 10 for on-time of the switch 33. As seen from FIG. 3, the drive current 110 is obtained by superimposing a drive current 140 at normal level, supplied from a boost-current source 32, on a normal-level drive current supplied from a drive-current source 31, as long as the switch 33 remains on. The on-time of the switch 33 is the boost time equivalent to the pulse width controlled by the pulse-width control circuit 24. While the switch 33 remains off, the STO control device supplies the drive current 110 at normal level, generated by the drive-current source 31, to the STO 30 (see FIG. 9D).

(Structures of the Magnetic Head and STO)

FIG. 4 is a diagram showing the structure of the magnetic head 10 used in the embodiment. FIG. 5 is a diagram showing the structure of the spin-torque oscillator (STO) 30 incorporated in the embodiment.

The magnetic head 10 comprises two major components, i.e., a write head 40 and a read head. The write head and the read head are isolated with an insulating layer (not shown) made of, for example, alumina. The read head has a magnetic read element 44 interposed between magnetic shields 45 and 46. The read element 44 is a GMR element or a tunneling magnetoresistive effect (TMR) element and reads data recorded on the disk 1 by means of perpendicular magnetic recording.

The write head 40 has a U-shaped recording magnetic pole. The recording magnetic pole comprises a main magnetic pole 41 and a return path (shield) 42. The write head 40 further has an exciter coil 43 and the STO 30. When a write current is supplied to the excitation coil 43, the recording magnetic pole generates a recording magnetic field. As a result, perpendicular magnetic recording is performed on the disk 1. At this point, the recording magnetic field acts not only on the magnetic disk 1, but also on the STO 30. Since the STO 30 assumes the polarity of the magnetic field applied to it, though the polarity of the drive current 110 remains unchanged.

The STO 30 is arranged near the recording magnetic pole. As shown in FIG. 5, the STO 30 is a laminated structure composed of a first electrode 51, a second electrode 52, an oscillation layer 53 (first magnetic layer), an intermediate layer 54, and a spin injection layer 55 (second magnetic layer). The intermediate layer 54 is a high-spin transmittance layer. When the drive current 110 is supplied to the interface between the first electrode 51 and the second electrode 52, the oscillation layer 53 generates a high-frequency magnetic field. The high-magnetic field is applied to the magnetic disk 1, whereby high-frequency assisted, magnetic recording is accomplished.

(Operation of the Magnetic Head and Head Amplifier IC)

FIGS. 6A to 6E are a timing chart explaining the basic operation of the magnetic head 10 and head amplifier IC 11 provided in the present embodiment.

Figure 6:
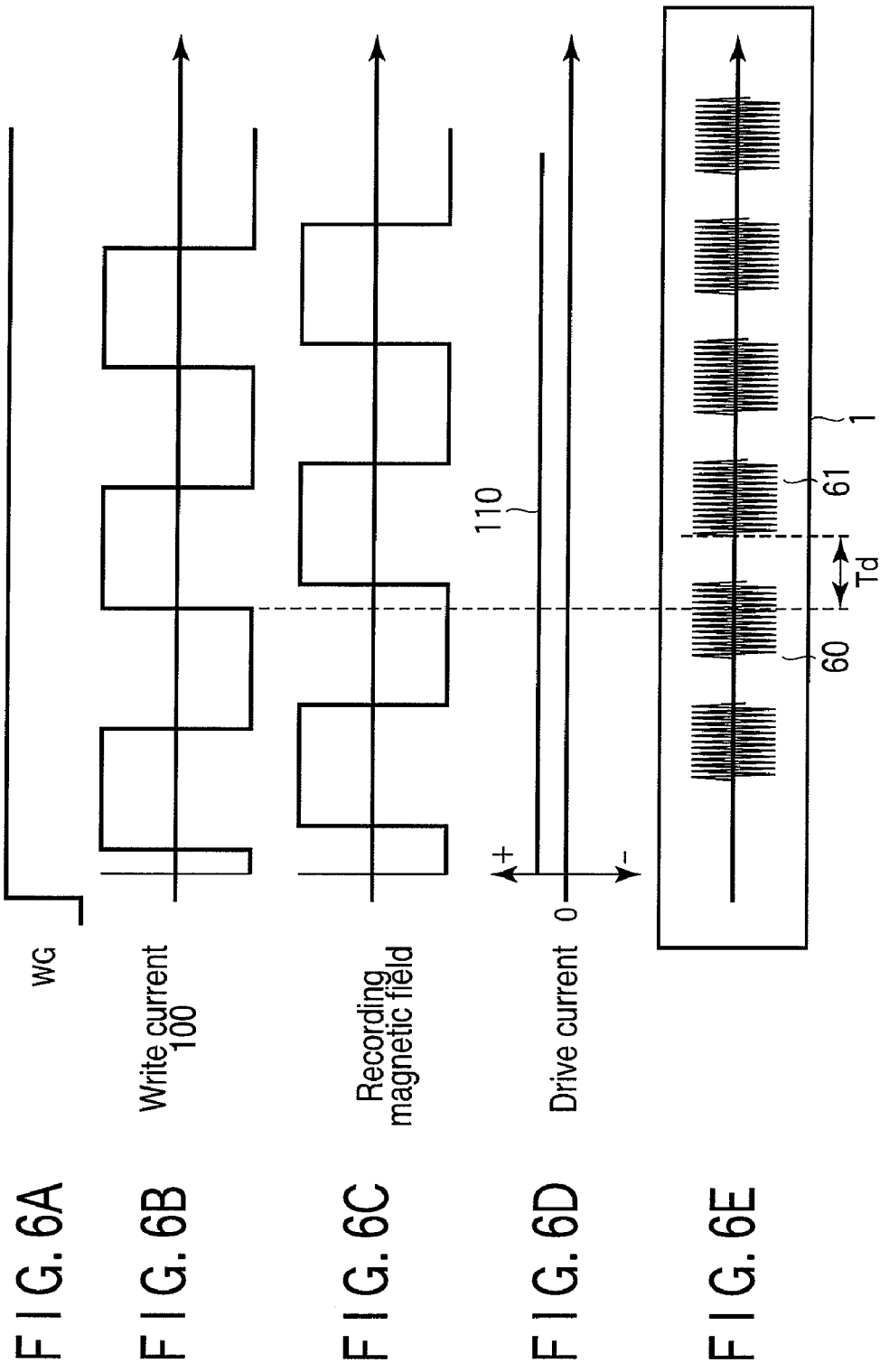
FIGS. 6A to 6E are a timing chart explaining the basic operation of the magnetic head and head amplifier IC provided in the embodiment.

In the disk drive, the write operation of recording write data on the disk 1 is started at the timing of a write gate signal WG output from the HDC 13, as is illustrated in FIG. 6A. The write gate signal WG is supplied to the head amplifier IC 11. The head amplifier IC 11 supplies a write current (recording current) 100, which corresponds to the write data 120 as shown in FIG. 6B, to the magnetic head 10.

In the magnetic head 10, when the write current 100 is supplied to the exciter coil 43, the recording magnetic pole generates a recording magnetic field with a delay with respect to the waveform of the write current 100 as shown in FIG. 6C. As shown in FIG. 6D, the drive circuit 26 supplies a DC drive current 110 at normal level to the STO 30 at the timing of the write gate signal WG.

When the recording magnetic field exceeds a prescribed level while the DC drive current 110 is being supplied to the STO 30, the STO 30 applies a high-frequency magnetic field 60 to the disk 1 upon lapse of a predetermined time (delay time) as shown in FIG. 6E. When the write current 100 is inverted in polarity, defining the timing of next magnetization inversion, the write head generates a recording magnetic field that extends in the opposite direction to the preceding magnetization. This recording magnetic field makes the STO 30 generate a high-frequency magnetic field 61 upon lapse of the predetermined delay time Td. Then, the STO 30 generates a high-frequency magnetic field 61 at every magnetization inversion.

FIG. 7 is a graph showing the relationship between the DC drive current 110 and the oscillation delay time Td of the STO 30. FIG. 8 is a diagram showing the relationship between the drive current 110 and the time for which a current is supplied to the STO 30 until the STO 30 fails.

Assume that the magnetic disk 1 has a diameter of 2.5 inches and storage capacity of 500 GB (at both sides). Then, the STO 30 has an element size of about 30×30 nm. To drive the STO 30, the current density must be higher than $6 \times 10^7$ $A/cm^2$, as is known experimentally. If the current density is higher than $5 \times 10^8$ $A/cm^2$, however, heat will break the STO 30 down, as is confirmed in the art. Hence, it is desirable to supply a current ranging from 0.54 to 4.5 mA to the STO 30. To be more specific, the breakdown of the STO 30 depends on not only the current, but also the current-supply time.

FIG. 8 is based on an experiment in which various direct currents were supplied to spin-torque oscillators identical to the STO 30 until the oscillators failed. As can be seen from FIG. 8, the STO 30 will fail if a drive current of, for example, 5 mA, is supplied to it for only tens of picoseconds. In contrast, if the drive current is 3 mA or less, the STO 30 continues to operate for 2 hours or more before it fails. Thus, the continuous recording time of the magnetic head 10 and the breakdown of the STO 30 have a trade-off relationship. It has been experimentally confirmed that the STO 30 fails within a time of nanosecond order or second order if it is continuously supplied with a drive current ranging from 3.5 to 4.5 mA.

As has been experimentally confirmed and seen from FIG. 7, the larger the drive current of the STO 30, the shorter the oscillation delay time Td that elapses until the STO 30 starts oscillation. In FIG. 7, curve 200 indicates the relationship between the drive current and the oscillation delay time, and curve 210 indicates the relationship between the drive current and the data transfer rate.

The magnetic disk 1 may have a diameter of 2.5 inches and storage capacity equivalent to 500 GB (at both sides). In this case, the data transfer rate will be about 2 to about 2.5 Gbps if the disk 1 is rotated at the speed of 7200 rpm. Then, the shortest magnetization inversion time during the magnetic recording performed on the disk 1 will correspond to 0.4 to 0.5 ns.

If high-frequency assisted magnetic recording is performed in such a disk drive, the longest oscillation delay time Td the STO 30 may have should be less than or equal to the shortest magnetization inversion time. Otherwise, the disk drive cannot accomplish the high-frequency assisted, magnetic recording. Further, in view of the temperature margin and the characteristics deviation from the design values of the STO 30, the oscillation delay time should be half the shortest magnetization inversion time, or be shorter than half the shortest magnetization inversion time. In other words, if the longest oscillation delay time is 0.2 ns or more, a high-frequency magnetic field may not be generated, ultimately causing recording errors in any period equivalent to the shortest magnetization inversion time.

In view of the above, the DC drive current should better be 4 mA or more as can be understood from curve 200 shown in FIG. 7. To keep the STO 30 oscillating, a DC drive current of about 1.6 mA may be supplied to the STO 30 whose element size of about 30×30 nm, as is confirmed experimentally. If only a DC drive current of 1.6 mA is supplied to the STO 30, however, the longest oscillation delay time will be 0.6 ns, inevitably causing data-recording errors as pointed out before. Hence, a DC drive current of 1.6 mA does not work in any disk drive that has a data transfer rate of 2 to 2.5 Gbps.

Hence, it is desired that a drive current of 4 mA or more should be supplied to the STO 30. If a drive current of 4 mA or more is continuously supplied to the STO 30, however, the STO 30 will possibly fail within a time of nanosecond order, as seen from the relationship shown in FIG. 8, i.e., relationship between the drive current and the time for which a current is supplied to the STO 30 until the STO 30 fails.

In view of this, the head amplifier IC 11 used in this embodiment has an STO control device that comprises components 21 to 26 as shown in FIG. 2. The oscillation delay time of the STO 30 is shortened, thereby enhancing the anti-breakdown property of the STO 30. How the head amplifier IC 11 operates will be explained with reference to FIG. 2 and FIGS. 9A to 9E.

In the disk drive, the write gate signal WG output from the HDC 13 is supplied to the head amplifier IC 11 as shown in FIG. 9A, in order to perform data writing (write operation). As shown in FIG. 9B, the head amplifier IC 11 supplies to the magnetic head 10 the write current 100 (recording current) that corresponds to the write data 120. When the write current 100 is supplied to the coil 43, the write head of the magnetic head 10 generates a recording magnetic field from the recording magnetic pole, with a delay with respect to the waveform of the write current 100 as shown in FIG. 9C.

As shown in FIG. 9D, the drive circuit 26 supplies a DC drive current 110A at normal level to the STO 30 at the timing of the write gate signal WG. Continuously supplied with the DC drive current 110A at normal level, the STO 30 continues to generate a high-frequency magnetic field.

The zero-cross detector 21 detects the timing that the write current 100 is inverted in polarity. The write current 100 is output from the write-current supply circuit 20. The pulse generator 22 generates a pulse signal that accords with the polarity inversion of the write current 100, which the zero-cross detector 21 has detected. The delay circuit 23 delays the pulse signal output from the pulse generator 22, by the delay time set in the register.

The pulse-width control circuit 24 increases the pulse width of the pulse signal supplied from the pulse generator 22. That is, the pulse generator 22 and the pulse-width control circuit 24 cooperate, generating a boost signal at the timing the recording current crosses zero. The boost signal thus generated is supplied to the drive circuit 26. Note that the boost signal is a pulse signal (110B) having a pulse width that is set by the pulse-width control circuit 24 and that is shorter than the shortest magnetization inversion time. The pulse width of the boost signal should be half the shortest magnetization inversion time, or be shorter than half the shortest magnetization inversion time.

The drive circuit 26 superimposes the drive current 110A at normal level, supplied from the drive-current supply circuit 25, with the boost-signal current set in the register, for a time corresponding to the pulse width of the boost signal. That is, the drive circuit 26 supplies to the STO 30 a boost drive current 110B that remains at a level higher than the normal level for a prescribed time as shown in FIG. 9D. In this case, it is desired that the drive current 110 be boosted at the same time the recording magnetic field is inverted in polarity as shown in FIG. 9C.

Unlike the zero-crossing of the write current, the polarity inversion of the recording magnetic field delays in most cases. The drive current should therefore be boosted at an appropriate time. To this end, the head amplifier IC 11 used in this embodiment has a delay circuit 23 and outputs the boost drive current 110B generated by boosting the drive current 110A at an appropriate time with respect to the inversion of the recording magnetic field.

The head amplifier IC 11 used in this embodiment supplies to the STO 30 a boost drive current 110B obtained by boosting the drive current 110A as shown in FIG. 9D, at an appropriate time after the write current 100 has been inverted. As shown in FIG. 9E, the STO 30 generates a high-frequency magnetic field 60 and applies the same to the disk 1, when the recording magnetic field exceeds a prescribed level while the drive current 110A at normal level is supplied to the STO 30.

When the write current 100 is inverted in polarity, defining the timing of next magnetization inversion, the write head generates a recording magnetic field that extends in the opposite direction to the preceding magnetization. This recording magnetic field makes the STO 30 generate a high-frequency magnetic field 61 upon lapse of the predetermined delay time Td. In this case, the head amplifier IC 11 supplies to the STO 30 a boost drive current 110B at a level higher than the normal level. This shortens the delay time Td, i.e., period between the time the write current is inverted in polarity and the time the STO 30 starts operating. The disk driver can therefore accomplish high-frequency assisted, magnetic recording.

The time for which the boost drive current 110B is supplied to the STO 30 is short, equivalent to the pulse width shorter than the shortest magnetization inversion time. This prevents the STO 30 from failing within a short time. Since the drive current 110A remaining at normal level is supplied to the STO 30 after the supply of the boost drive current 110B, the high-frequency magnetic field the STO 30 generates remains stable.

A method of designing the disk drive having the STO 30 and configured to perform high-frequency assisted, so that the manufacture yield may be high, will be explained below.

To make the STO 30 operate at high efficiency, the drive current 110A, the boost drive current 110B, the boost width (pulse width), and the parameter of the delay from the zero-cross time must be set appropriately. The way the STO 30 oscillates changes in accordance with its material, its structure, its characteristics and its temperature environment.

The parameters pertaining to the STO 30 must therefore be set to optimal values in accordance with its use environment and the characteristics of the magnetic head. In the present embodiment, the head amplifier IC 11 has various registers into which the CPU 14 can write the parameters. Thus, the drive current 110A, the boost drive current 110B, the boost width (pulse width), and the parameter of the delay from the zero-cross time are set in these registers, respectively.

In this method, the optimal values for the parameters of, for example, the magnetic head are set in the registers in the step of testing the disk drive. Each register may have a setting table that holds various parameter values. In this case, an optimal parameter value may be selected from the setting table in accordance with, for example, the temperature environment of the disk drive.

In the embodiment described above, a drive-current signal is supplied as a drive signal that causes the STO 30 to generate a high-frequency magnetic field. Nonetheless, a drive-voltage signal may be applied to the STO 30. Moreover, the STO 30 may be activated at the same time the write gate signal WG is input, or some time after the write gate signal WG is input. In this case, a drive current must be supplied to the STO 30 before the write head generates the recording magnetic field.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
a magnetic disk;
a magnetic head comprising a main magnetic pole configured to generate a recording magnetic field and a spin-torque oscillator, the spin-torque oscillator being near the main magnetic pole and configured to apply a high-frequency magnetic field to the magnetic disk in order to record data on the magnetic disk;
a write-signal transmitter configured to transmit a write signal corresponding to write data to the magnetic head, in order to record the data on the magnetic disk; and
a controller configured to continuously supply a drive signal of a first predetermined level to the spin-torque oscillator in order to record the data and to supply a drive signal of a second level higher than the first predetermined level, for a predetermined time after the write signal has been inverted in polarity.

2. The disk drive of claim 1, wherein the controller comprises a module configured to superimpose the drive signal of the second level on the drive signal of the first predetermined level for the predetermined time after the polarity inversion of the write signal.

3. The disk drive of claim 1, wherein the controller comprises an inversion-detecting module configured to detect polarity inversion of the write signal from the write-signal transmitter, and a signal-generator configured to generate a drive signal at a level higher than the first predetermined level for the predetermined time.

4. The disk drive of claim 1, wherein the write-signal transmitter is configured to transmit a write signal corresponding to the write data to the magnetic head after a write gate signal is received instructing a start of data recording, and the controller is configured to supply the drive signal of the first predetermined level to the spin-torque oscillator when or after the write gate signal is received.

5. The disk drive of claim 1, wherein the controller comprises an inversion-detecting module configured to detect polarity inversion of the write signal from the write-signal transmitter, and a delay module configured to generate a designated delay time from the detected polarity inversion, wherein the controller is configured to first supply a drive signal of a level higher than the first predetermined level for a predetermined time after the designated delay time from the detected polarity inversion, and then to supply a drive signal of the first predetermined level.

6. The disk drive of claim 5, wherein the controller comprises a register configured to hold at least one of values comprising the value of the drive signal of the first predetermined level, the value of the drive signal of the second level, the duration of the signal of the second level and the designated delay time.

7. The disk drive of claim 1, wherein the controller is configured to supply a current signal or a voltage signal, as the drive signal, to the spin-torque oscillator.

8. A head control apparatus comprising:
a write-signal transmitter configured to transmit a write signal corresponding to write data to a magnetic head comprising a spin-torque oscillator configured to apply a high-frequency magnetic field to a magnetic disk in order to record data on the magnetic disc; and a controller configured to continuously supply a drive signal of a first predetermined level to the spin-torque oscillator in order to record data on the magnetic disk, and to supply a drive signal of a second level higher than the first predetermined level to the spin-torque oscillator for a predetermined time after the write signal corresponding to the write data is inverted in polarity.

9. The apparatus of claim 8, wherein the controller comprises a module configured to superimpose the drive signal of the second level on the drive signal of the first predetermined level supplied to the spin-torque oscillator, for a predetermined time after the write signal is inverted in polarity in order to supply the drive signal of the second level to the spin-torque oscillator.

10. The apparatus of claim 8, wherein the controller comprises:

an inversion-detecting module configured to detect polarity inversion of the write signal from the write-signal transmitter;

a delay module configured to generate a designated delay time from the detected polarity inversion;

a pulse generating module configured to generate a pulse signal comprising a pulse width, for a predetermined time after the designated delay time has elapsed; and a module configured to supply a drive signal of a level higher than the first predetermined level to the spin-torque oscillator, in accordance with the pulse signal.

11. The apparatus of claim 10, further comprising a register configured to hold at least one of values comprising the value of the drive signal of the predetermined level, the value of the drive signal of the second level, the duration of the signal of the second level and the designated delay time.

12. The apparatus of claim 8, wherein the controller is configured to supply a current signal or a voltage signal, as the drive signal, to the spin-torque oscillator.

13. A method of controlling a magnetic head incorporated in a disk drive and comprising a spin-torque oscillator configured to apply a magnetic disk in order to record data on the magnetic disk, the method comprising:

continuously supplying a drive signal of a first predetermined level to the spin-torque oscillator in order to record the data;

supplying a write signal corresponding to write data to the magnetic head, in order to record the data;

detecting polarity inversion of the write signal; and supplying a drive signal of a second level higher than the first predetermined level for a predetermined time when the polarity inversion of the write signal is detected.

* * * * *